Jan. 9, 1934.     C. F. WARD     1,943,196
ATTACHMENT FOR TRACTOR CRANES
Filed July 18, 1932     2 Sheets-Sheet 1
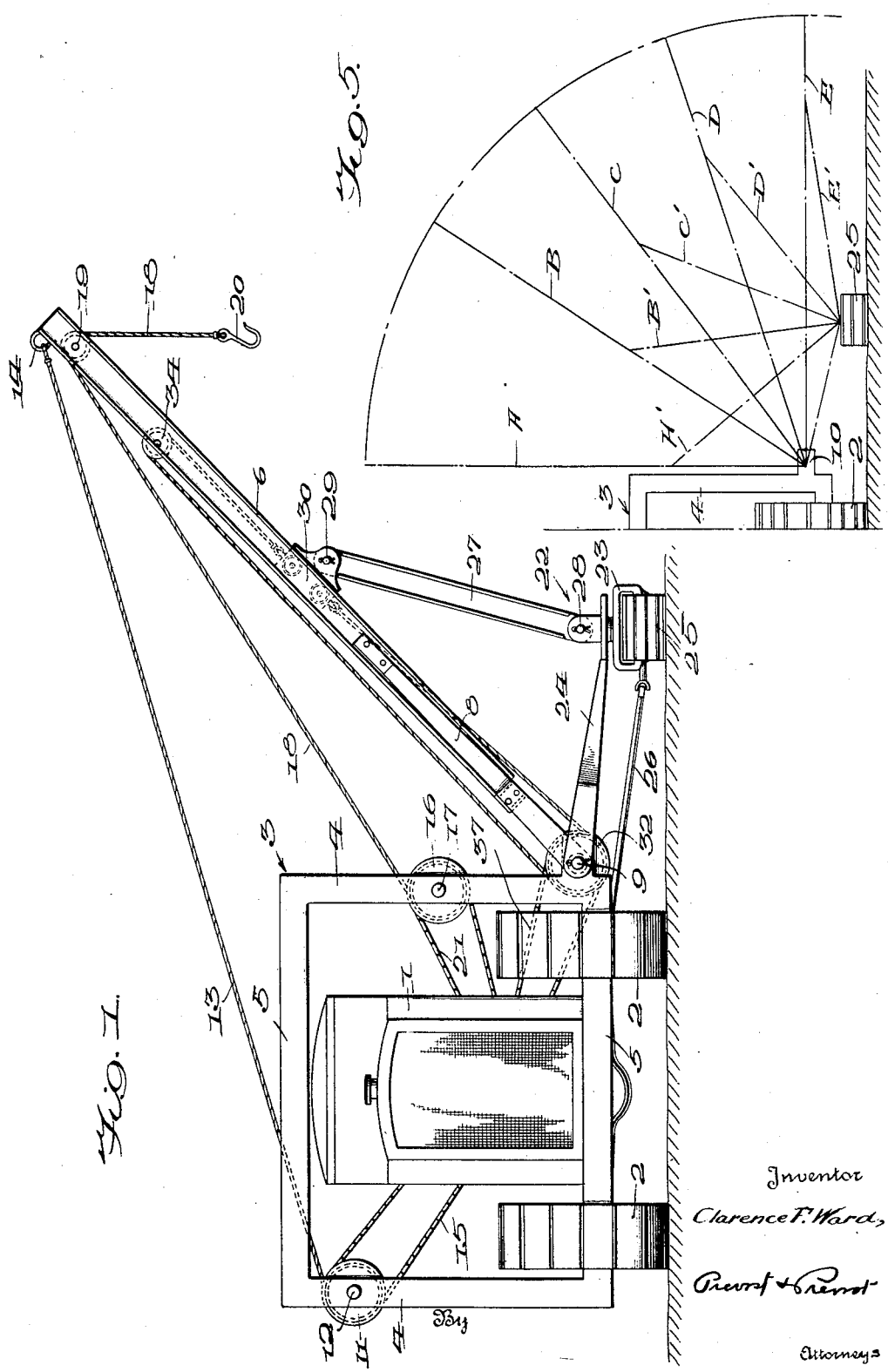

Jan. 9, 1934.  C. F. WARD  1,943,196
ATTACHMENT FOR TRACTOR CRANES
Filed July 18, 1932  2 Sheets-Sheet 2
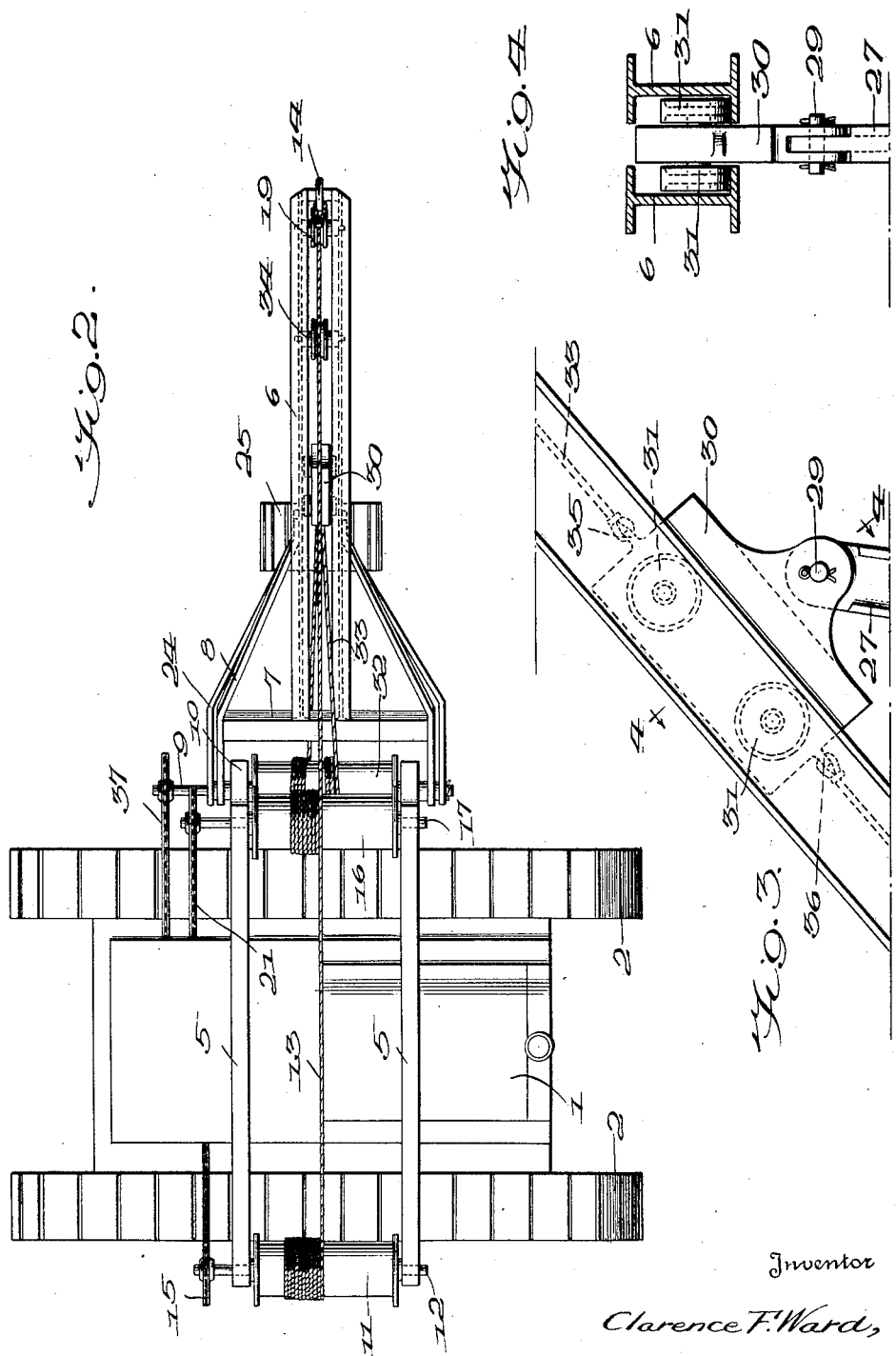
Inventor
Clarence F. Ward,
By
Attorneys Patented Jan. 9, 1934

1,943,196

UNITED STATES PATENT OFFICE 1,943,196

ATTACHMENT FOR TRACTOR CRANES

Clarence F. Ward, Birmingham, Ala.

Application July 18, 1932. Serial No. 623,234

9 Claims. (Cl. 212—145)

My invention consists in new and useful improvements in an attachment for tractors of the type which is equipped with cranes or derricks, and has for its object to provide means for supporting the outer end of the boom of the crane directly from the ground.

It is well-known that without some supporting means for the boom, the lifting power of a tractor crane is greatly limited due to the tipping of the tractor. Consequently others have worked to this same general end of preventing tipping by providing supporting legs which depend from the boom with their lower ends resting upon the ground in a stationary relation thereto. Others have provided counter-weights by means of which the lifting power of the tractor has been increased as much as 22%.

The primary object of my invention is to overcome the possibility of tipping the tractor and to increase the lifting power of the mechanism from 50% to 200% depending upon the angle of the boom, and at the same time to provide an attachment whereby the tractor may be propelled along the ground while supporting a heavy object on the boom.

To this end I have provided what I term a "live stiff leg" which is supported from the tractor body, one end of said leg being adjustably connected to the tractor boom and the other end supported upon an auxiliary power operated endless tread.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Figure 1 is a view in front elevation showing the relation of the live stiff leg and auxiliary tread, to the tractor body.

Fig. 2 is a top plan view of the same.

Fig. 3 is an enlarged detail showing the adjustable connection between the upper end of the stiff leg and the tractor boom.

Fig. 4 is a sectional view taken on line 4—4 of Fig. 3, and

Fig. 5 is a diagrammatic showing of the various positions of the tractor boom and stiff leg for the respective degrees of elevation of the tractor boom.

In the drawings, 1 represents a conventional tractor having the usual endless treads 2. 3 designates a frame of suitable rigid material mounted on the tractor and preferably consisting of four uprights or vertical members 4 connected together at their extremities by horizontal members 5 which extend transversely of the tractor adjacent its mid-section.

To one side of the frame 3, preferably toward the lower extremity of one pair of uprights 4, I secure a boom 6 which, for the purpose of illustration, I have shown as made up of two I-beams secured together in transverse spaced relation. The lower ends of the I-beams 6 are rigidly secured to a cross bar 7 which is fastened between the arms of a bifurcated yoke 8, said arms converging toward one another at one end and being rigidly secured to the I-beams at a point intermediate their ends. At the other end of said yoke the arms are arranged in parallel spaced relation and are provided with apertures adapted to engage a shaft 9 which is rotatably mounted in extensions 10 carried by the uprights 4 of the frame, whereby the boom 6 is fulcrumed to the frame.

11 represents a drum which is rotatably interposed between the opposite set of uprights 4 on a shaft 12 carried by said uprights, said drum having wound thereon one end of a cable 13, the other end of which is fastened to the free end of the boom 6 by a ring 14 or any other suitable means. Power for rotating the drum 11 may be transmitted from the power unit of the tractor by means of a belt or chain 15. Thus upon the rotation of the drum 11 in the proper direction, the boom will be swung about an arc on its fulcrum shaft 9.

A second drum 16 is arranged between the uprights 4 on the opposite side of the frame and is rotatable on a shaft 17 engaging said uprights. A cable 18 having one end reeled upon the drum 16 extends over a sheave 19 rotatably mounted at one end of the boom 6 between the pair of I-beams and carries at its free extremity a hook or the like 20. This drum may also be driven from the power unit of the tractor by a suitable belt or chain 21.

In order to support the tractor boom 6 and to prevent the tipping of the tractor when a heavy load is depending from the cable 18, I provide a live stiff leg assembly 22 which consists of an auxiliary endless track truck 23 which is supported from the tractor frame by means of a bifurcated yoke 24, one end of which is suitably secured to the tractor truck 23 and the other end fulcrumed on the shaft 9 adjacent the fulcrumed end of the boom yoke 8.

A relatively small endless tread 25 is operatively carried by the truck 23 and receives its rotary power through the medium of a jackshaft 26 operated from the transmission of the tractor whereby when the tractor is being propelled along the ground, a corresponding degree of motion is transmitted to the auxiliary tread from the tractor power unit as and for the purpose hereinafter set forth.

27 represents a stiff leg or supporting brace beam, one end of which is fulcrumed as at 28 to a suitable extension on the track truck 23, the other end of said stiff leg being pivotally connected as at 29 to a carriage 30 which is slidably mounted between the pair of I-beams constituting the boom 6. On either side of the carriage 30, I secure rollers 31, rotatably mounted in pairs on suitable short shafts as clearly shown in Figs. 3 and 4, said rollers being adapted to engage the adjacent flanges of the I-beams forming the boom 6, whereby said I-beams provide a track for the longitudinal movement of the carriage 30.

32 designates a third drum which is rotatably mounted between the frame extensions 10 on the shaft 9, said drum having wound thereon in opposite directions, the two ends of a cable 33 which passes over a sheave 34 rotatably mounted between the I-beams toward the free end of the boom 6. Adjacent the carriage 30 the cable 33 is parted and secured to opposite longitudinal extremities of the carriage as at 35 and 36, the carriage 30 being thus interposed in the cable 33, so to speak.

The drum 32 as in the case of drums 11 and 16, may receive power from the tractor transmission through the medium of a belt or chain 37. Thus upon the rotation of the drum 32 in either direction, the carriage 30 will be correspondingly moved in its track on the boom 6 to the desired position for supporting the boom at the angle of inclination at which the crane is to operate. Referring to Fig. 5, A, B, C, D and E, and A', B', C', D' and E' show respectively, the relative positions of the boom and stiff leg for various angles of the boom.

With the boom and stiff leg adjusted to the proper position, the object to be elevated and transported from one point to another is engaged by the hook or gripping member 20 on the free end of cable 18, and the drum 16 is rotated from the tractor transmission to wind the cable 18 on the drum and elevate the object. The tractor 1 is then propelled along the ground under its own power which is simultaneously transmitted to the auxiliary tread 25 by the jackshaft 26. Thus the stiff leg 27 which is interposed between the boom and the auxiliary truck 23 functions to support the boom while the tractor is in motion.

It will be noted that should the ground be uneven upon which the crane is to operate, the stiff leg and auxiliary truck may be adjusted to compensate for such irregularity, by manipulating the carriage 30 as heretofore described, to raise or lower the auxiliary truck with respect to the main tractor treads 2.

Further, if it is found unnecessary to employ the auxiliary supporting leg or in transporting the tractor from place to place without a load, the carriage 30 may be moved to its extreme upward position on the boom 6, thus elevating the auxiliary truck 23 to an inoperative position adjacent the under surface of the boom.

While I have shown and described the drums as operated by the tractor power, it is obvious that they may be manipulated by hand or any other suitable means. Furthermore, instead of the cable and drum arrangement 32 and 33, the carriage 30 may with equal effect be operated by a chain and sprocket if desired.

From the foregoing it is believed that the construction and operation of my improved tractor or crane attachment may be readily understood by those skilled in the art, without further description, it being borne in mind that numerous changes may be made in the details disclosed without departing from the spirit of the invention as set out in the following claims.

What I claim and desire to secure by Letters Patent is:

1. In a crane having an adjustable boom, a supporting leg, means at one end of said leg for adjustably engaging said boom, rotary means at the other end of said leg for progressively engaging the ground upon the movement of the crane and means for transmitting power to said last-named means.

2. A support for the boom of a crane, comprising a stiff leg, means at one end of said leg for engaging said boom intermediate the ends of the latter, and means at the other end of said leg for movably engaging the ground upon the horizontal movement of said boom with respect to the ground.

3. In a movable crane having an adjustable boom, a supporting leg, means at one end of said leg for adjustably engaging said boom intermediate the ends of the latter, and an auxiliary track truck carried by said crane and supporting the lower end of said leg.

4. In a tractor crane having an adjustable boom, a supporting leg, means at one end of said leg for adjustably engaging said boom intermediate the ends of the latter, and an endless tread carried at the lower end of said leg in engagement with the ground.

5. A structure as claimed in claim 4 including means for transmitting rotary power to said tread from the power unit of said tractor.

6. In a crane having an adjustable boom, a carriage mounted on said boom and adapted to slide longitudinally thereon, a supporting leg, said carriage being operatively connected to the upper end of the latter, means at the other end of said leg for movably engaging the ground, and means driven by the power unit of the crane for adjusting the position of said carriage on said boom, to accommodate the latter's angle of inclination.

7. In a tractor crane having an adjustable boom, means for supporting said boom from the ground, comprising an auxiliary supporting truck carried by said tractor, a stiff leg fulcrumed at one end on said truck, its other end adjustably engaging said boom, power driven means for adjusting the position of said leg on said boom and means for transmitting power from the tractor to said supporting truck.

8. A structure as claimed in claim 7 wherein said supporting truck is provided with an endless tread.

9. A structure as claimed in claim 7 wherein said leg is connected to said boom by means of an adjustable carriage, the latter running in a track on the boom.

CLARENCE F. WARD.